(12) United States Patent
Creedon et al.

(10) Patent No.: US 6,430,192 B1
(45) Date of Patent: Aug. 6, 2002

(54) METHOD FOR TRANSMITTING MULTIMEDIA PACKET DATA USING A CONTENTION-RESOLUTION PROCESS

(75) Inventors: Tadhg Creedon, Galway County (IR); David J. Law, Kempston; Terence D. Lockyer, Bedford, both of (GB); Nigel Horspool, Tervuren (BE)

(73) Assignee: 3COM Technologies, Georgetown (KY)

( * ) Notice: Subject to any disclaimer, the term of this patent is extended or adjusted under 35 U.S.C. 154(b) by 0 days.

(21) Appl. No.: 09/229,753

(22) Filed: Jan. 14, 1999

(30) Foreign Application Priority Data

May 28, 1998 (GB) .............................................. 9811468

(51) Int. Cl.[7] .............................................. H04L 12/54
(52) U.S. Cl. ..................... 370/428; 370/448; 370/501
(58) Field of Search ................................ 370/445, 447, 370/448, 501, 315, 446, 412–416, 508, 314, 473, 432, 236, 246, 502, 492, 493, 495

(56) References Cited

U.S. PATENT DOCUMENTS

| | | | |
|---|---|---|---|
| 5,351,241 A | * 9/1994 | Yehonatan | 370/446 |
| 5,353,287 A | 10/1994 | Kuddes et al. | 37/448 |
| 5,453,987 A | 9/1995 | Tran | 370/447 |
| 5,568,476 A | * 10/1996 | Sherer et al. | 370/236 |
| 5,883,901 A | * 3/1999 | Chiu et al. | 370/508 |
| 6,172,983 B1 | * 1/2001 | Shaffer et al. | 370/466 |

FOREIGN PATENT DOCUMENTS

| | | |
|---|---|---|
| EP | 0 833 479 A1 | 4/1998 |
| WO | WO 87/01545 | 3/1987 |
| WO | WO 92/10041 | 6/1992 |

* cited by examiner

*Primary Examiner*—Ricky Ngo
*Assistant Examiner*—Phuc Tran
(74) *Attorney, Agent, or Firm*—Nixon & Vanderhye, P.C.

(57) ABSTRACT

A method of operating a repeater for a packet-based data transmission system wherein the repeater has a receiving port associated with a buffer whereby packets received at the port are temporarily stored before they are onwardly transmitted and wherein the repeater performs a contention resolution process such that if an attempted onward transmission of a packet is prevented by virtue of contention with a prior or an existing transmission, a subsequent attempt at transmission of that packet is delayed for a time which is likely to be substantially greater than a selected minimum time. The method includes examining a received packet to determine whether the packet is a multi-media packet, and giving the packet a higher priority in the contention resolution process such that if the packet is not transmitted onwardly owing to contention with a prior transmission, a fresh attempt at transmission of the packet is made on the expiry of the selected minimum time.

5 Claims, 2 Drawing Sheets

METHOD FOR TRANSMITTING MULTIMEDIA PACKET DATA USING A CONTENTION-RESOLUTION PROCESS

FIELD OF THE INVENTION

This invention relates to repeaters for Ethernet or similar packet-based data communication networks, wherein at a hub or repeater a multiplicity of sources of data are provided with access by way of a contention-resolution process. The invention particularly concerns the transmission of multi-media data, such as voice or television data, in packet form, through such a repeater.

BACKGROUND TO THE INVENTION

Network repeaters which allow onward transmission by one data source at a time on a common network path are well known. It is known to use a system in which a source which has data to transmit listens for the presence of carrier in the common path and transmits its data only if no contention with existing carrier is detected. In modern, digital systems, the detection of carrier is represented by the detection of, for example, non-idle data symbols on the common path and permission to transmit is accorded if transmission is to commence after some defined interval (e.g. an inter-frame gap) measured from after an end of frame delimiter field, as in for example the IEEE.802.3 standard for carrier-sense multiple access with collision detection.

It is also known, in systems of this nature, to require a station which has data to transmit and detects contention, so that it is prevented from transmitting in accordance with the relevant standards, to repeat its attempt to transmit only after a delay which is pseudo randomly selected to be equal to some multiple, between 1 and n (where n may be typically 10) of a minimum 'back-off' time. Such arrangements are quite successful and are in widespread use where the system can tolerate some variable delay (i.e. latency) in transmission of data packets from any of the stations (i.e. buffered ports) that may transmit data.

Difficulties necessarily arise when one or more of the stations has to be accorded a higher priority. One example of a scheme for enabling high priority stations and low priority stations to transmit using the same basic contention-resolution process is described in EP-A-0833479. That describes a contention-resolution process wherein high priority stations transmit in cycles and within each cycle they transmit in an order determined from their rankings, and each station which wishes to transmit further data immediately after it is transmitted data in a current cycle refrains from the contention-resolution process until it is determined that the current cycle has been completed. The aforementioned document discloses the transmission of television data via Ethernet interfaces which carry other, low priority traffic.

The present invention is concerned with the problem of giving a repeater receiving port a high priority for onward transmission of data in the event that the port is receiving multi-media traffic such as data packets conveying television data, which need transmission through a network with a substantially consistent latency. Although a variety of schemes can be devised which give a particular port high priority, the assignment of high priority to a port for all traffic through the port tends to degrade the performance of the network in respect of other traffic from other ports.

BRIEF SUMMARY OF THE INVENTION

The present invention is based on a technique wherein packets received at a receiving port of a repeater are buffered and at least partially parsed or examined to determine whether they are multi-media packets. If a packet is thereby determined to be from a source or intended for a destination which is identified as a multi-media device the device may be identified in a look-up table so that subsequent packets from the same source or to the same destination may be identified as multi-media packets by reference to the look-up table. A multi-media packet identified in this manner is given priority by the modification of the contention-resolution rules in its favour. In particular, whereas according to the ordinary rules, packets cannot be transmitted if there is detection of contention and must wait for a pseudo random period before a further attempt to transmit is made, a packet which is given priority according to the invention can be the subject of a new attempt to transmit after a fixed time from the detection of contention. If the packet is not so treated, then it will be transmitted according normal contention resolution rules operative in the repeater, such that if contention is detected re-transmission will be attempted after a pseudo random delay.

Provided that multi-media traffic is a fairly low percentage of traffic through the repeater, for example not greater than ten percent, the technique may work well because the bulk of the signal traffic through the repeater will not be given unfair advantage. The technique is intended to improve consistency of latency for multi-media traffic not necessarily to improve the throughput of it.

The technique according to the invention may be relevant to any bridge-repeater design, where bridging is made between segments and repeating performed on each segment and it may be adapted for systems with both half and full duplex link, with buffering at a receive port only or with buffering both at transmit ports and receive ports. It may also be applied to a full bridge between a multi-media source link and a repeater.

Detailed Description

Figure 1:
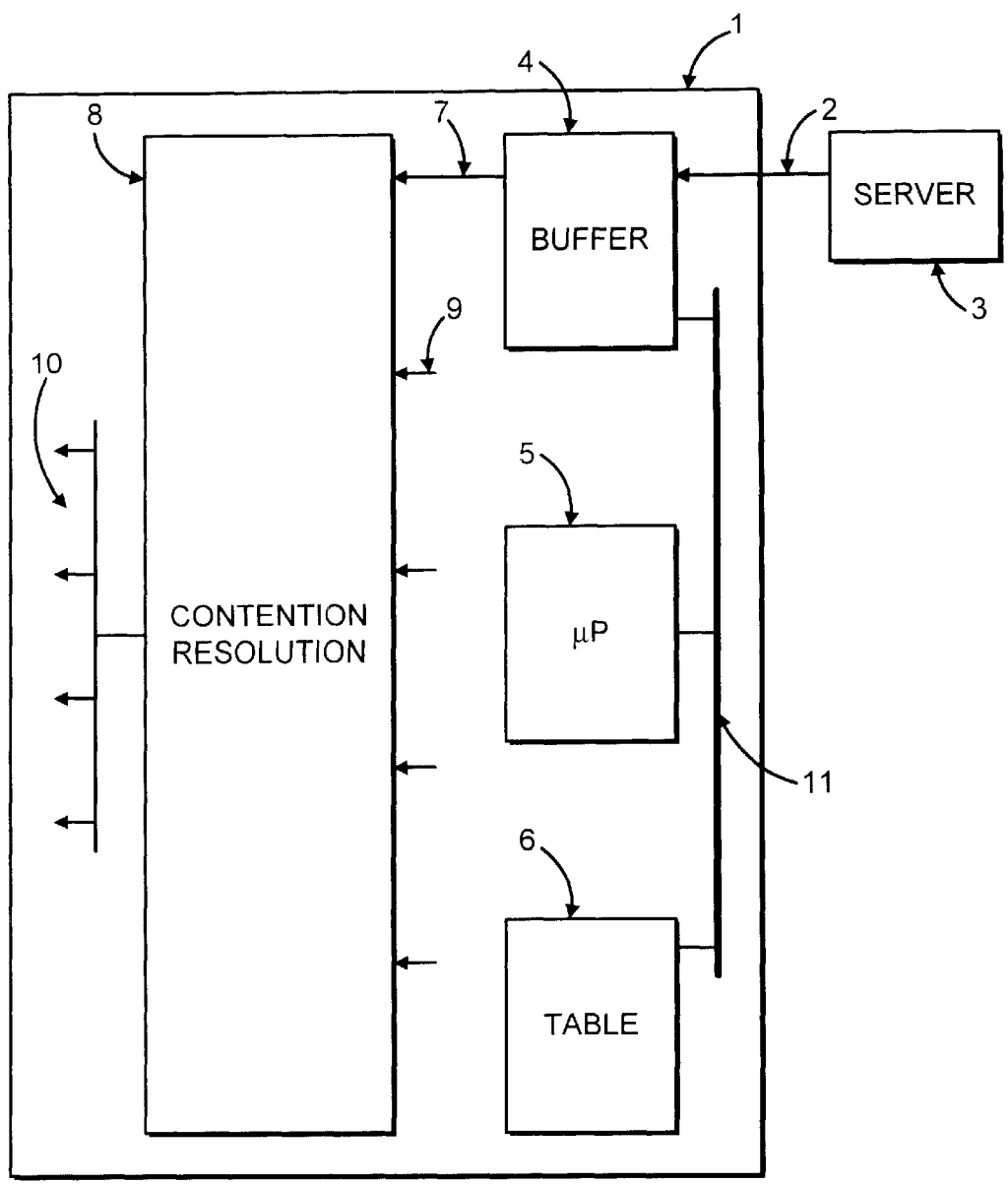
FIG. 1 illustrates schematically a repeater according to the invention.

FIG. 1 illustrates in a functional schematic form part of a network which includes a repeater 1 which is in a generally known form. Only the parts relevant to the present invention will be described. At least one of the ports 2 of the repeater is buffered so that data packets received at the port are temporarily stored in a buffer 4 until they can be transmitted from the repeater, after a contention-resolution process. The buffer has an output 7 to a contention-resolution function 8 which receives on inputs such as input 9 packets from other (non-buffered) ports. Packets transmitted as a result of the contention-resolution process are transmitted from the other ports 10, i.e. from the ports other than the port at which the packet was received.

Also shown in FIG. 1 is a processing means illustrated as a microprocessor 5, and a storage means in the form of a look-up table 6, the buffer 4, the processing means 5 and storage means 6 being connected by a bus 1.

The processing means 5 operates to determine whether the first packet in the buffer queue in buffer 4 has an address listed in the table as a multi-media destination. If so, the packet may (but need not) be tagged to indicate that it is a multi-media packet and also to indicate that it is to be given priority in the contention-resolution process. Should there be no listed address for the packet, the processing means may parse the packet partially, for example using the procedure defined in IEEE.802.1p, to determine whether the packet is actually a multi-media packet, such as a packet bearing television data. If the packet is a multi-media packet, then a new entry can be made in the table.

Figure 2:
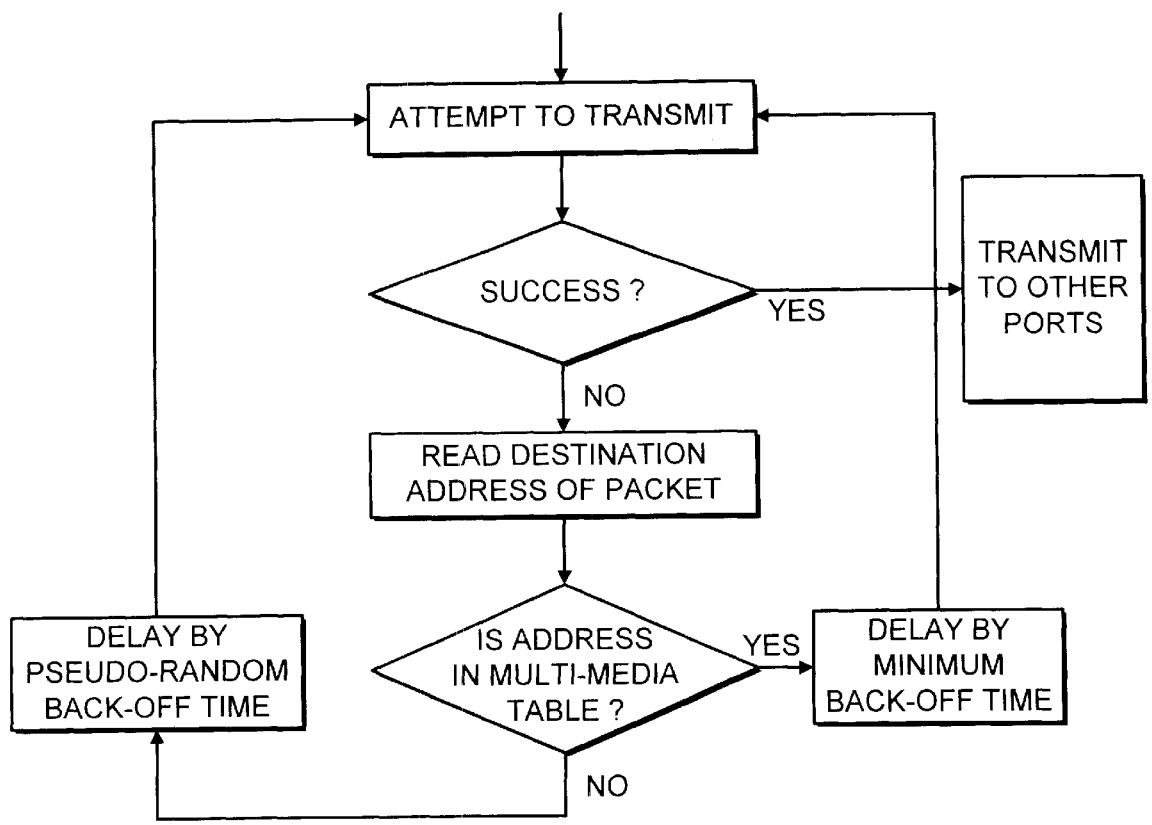
FIG. 2 illustrates a flow diagram of a modified contention-resolution process according to the invention.

FIG. 2 is a flow diagram which illustrates the modification of the contention-resolution process. It presumes the existence of a table of multi-media destination addresses, which can be established as indicated above or otherwise.

An attempt is then made to transmit the first packet in the queue in buffer 4. The contention-resolution process is preferably a carrier-sense collision detection process wherein normally, if collision with an existing transmission is detected (or an interframe gap is not yet expired), the station (in this case the buffered receive port) is forced to wait for a pseudo randomly selected time, typically between 1 and 10 interframe gaps. FIG. 2 omits for simplicity various desirable features of the contention-resolution process, such as a limitation (e.g. to 16) on the number of unsuccessful attempts that may be made before the packet is discarded. This part of the procedure will be followed if transmission is unsuccessful and the packet is not a multi-media packet.

If however the attempt at transmission is unsuccessful and by reference to the multi-media table the packet is presumed to be a multi-media packet, a new attempt at transmission is made after the minimum back-off time, for example a single interframe gap. The back-off time given to the high priority packets which are identified as multi-media packets need not be precisely the absolute minimum back-off time. It would be possible to provide a selected minimum represented by, for example, two interframe gaps, but in any event the minimum or relatively short back-off time needs to be substantially shorter than the average back-off time prescribed or selected for ordinary, non-multi-media packets.

We claim:

1. A method of operating a repeater for a packet-based data transmission system wherein the repeater has a receiving port associated with a buffer whereby packets received at the port are temporarily stored in said buffer before they are onwardly transmitted and wherein the repeater performs a contention resolution process such that if an attempted onward transmission of a packet from said buffer is prevented by virtue of contention with a prior transmission, a subsequent attempt at transmission of that packet is delayed, the method comprising:

(a) examining a received packet to determine whether the packet is a multi-media packet, giving the packet a higher priority if the packet is a multi-media packet and a lower priority if the packet is not a multi-media packet;

(b) for a higher priority packet, and if said packet is not transmitted onwardly from said buffer owing to contention with said prior transmission, making a fresh attempt at transmission of the packet from said buffer on the expiry of a selected fixed minimum time; and (c) for a lower priority packet, if said packet is not transmitted onwardly from said buffer owing to contention with said prior transmission, making a fresh attempt at transmission of said packet from said buffer after a time which is pseudo-randomly selected in a range up to a substantial multiple of said selected minimum time.

2. A method according to claim 1 wherein examining the received packet comprises examining an address in said packet and using a look-up table to determine whether the address corresponds to a stored address of a multi-media device.

3. A method according to claim 2 wherein said stored address is a destination address.

4. A repeater for a packet-based data transmission system, said repeater including:

at least one receiving port associated with a buffer for temporarily storing packets received at said port before they are onwardly transmitted;

means for performing a contention resolution process for preventing onward transmission of a packet from said buffer if there is contention with a prior transmission in said repeater, and for allowing a subsequent attempt of transmission of s aid packet from said buffer after a back-off interval; and means for examining said packet to determine whether the packet is a multi-media packet;

said repeater causing back-off time to be a selected fixed minimum time when said packet is a multi-media packet, and otherwise causing said back-off interval to be a pseudo-randomly selected time which is statistically substantially greater than said selected fixed minimum time.

5. A repeater according to claim 4 wherein said repeater is operative to examine an address in the packet and to determine with recourse to a look-up table whether said address corresponds to a stored address of a multi-media device.

* * * * *